United States Patent
Wang et al.

(10) Patent No.: US 10,322,746 B2
(45) Date of Patent: Jun. 18, 2019

(54) VELOCITY ESTIMATION FOR ELECTRIC POWER STEERING SYSTEMS

(71) Applicant: STEERING SOLUTIONS IP HOLDING CORPORATION, Saginaw, MI (US)

(72) Inventors: Qi Wang, Saginaw, MI (US); Prerit Pramod, Saginaw, MI (US); Anthony J. Champagne, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 122 days.

(21) Appl. No.: 15/365,060

(22) Filed: Nov. 30, 2016

(65) Prior Publication Data

US 2018/0148087 A1 May 31, 2018

(51) Int. Cl.
*B62D 5/04* (2006.01)
*B62D 15/02* (2006.01)

(52) U.S. Cl.
CPC ........... *B62D 5/0481* (2013.01); *B62D 5/046* (2013.01); *B62D 5/0409* (2013.01); *B62D 5/0463* (2013.01); *B62D 5/0472* (2013.01); *B62D 15/021* (2013.01)

(58) Field of Classification Search
CPC .... B62D 5/0472; B62D 5/046; B62D 5/0481; B62D 15/021; B62D 5/0409; B62D 5/0463
See application file for complete search history.

(56) References Cited

U.S. PATENT DOCUMENTS

| | | |
|---|---|---|
| 6,986,688 B1 | 1/2006 | Jansen |
| 2003/0179004 A1 | 9/2003 | Fukusumi et al. |
| 2008/0112697 A1 | 5/2008 | Kim |
| 2009/0000857 A1* | 1/2009 | Sugiyama ............ B62D 5/0463 180/444 |
| 2009/0254300 A1 | 10/2009 | Schneider et al. |
| 2011/0057593 A1 | 3/2011 | Williams et al. |
| 2013/0221885 A1 | 8/2013 | Hunter |
| 2014/0149000 A1* | 5/2014 | Tamura ................ B62D 5/0463 701/42 |
| 2014/0200767 A1* | 7/2014 | Mikamo .............. B62D 5/0463 701/41 |
| 2015/0198934 A1 | 7/2015 | Kaku et al. |
| 2015/0198935 A1 | 7/2015 | Kaku et al. |
| 2015/0239491 A1* | 8/2015 | Bolourchi ................ B62D 5/04 701/41 |
| 2018/0316291 A1 | 11/2018 | Pramod et al. |

* cited by examiner

*Primary Examiner* — Rodney A Butler
(74) *Attorney, Agent, or Firm* — Cantor Colburn LLP

(57) ABSTRACT

Technical solutions are described for facilitating a steering system to determine a motor velocity estimate for a motor of the steering system. For example, the steering system may include a state observer module that computes a base motor velocity estimate of the motor based on a plant model of the steering system. The steering system may further include a delay compensation module that computes a delay compensated velocity estimate based on the base motor velocity estimate and an acceleration of the motor. The steering system may further include a standstill detection module that modifies the delay compensated velocity estimate in response to a handwheel of the steering system being in standstill mode.

20 Claims, 7 Drawing Sheets

VELOCITY ESTIMATION FOR ELECTRIC POWER STEERING SYSTEMS

BACKGROUND

The present application is generally related to steering systems, and particularly to electric power steering (EPS) systems.

In control systems, such as an EPS, a state observer is a system or module that provides an estimate of the internal state of the real control system, from measurements of the input and output of the real system. Knowing the internal system state facilitates addressing technical problems associated with the real system; for example, stabilizing the real system using state feedback. Typically, the physical internal system state of the EPS cannot be determined by direct measurement. Instead, indirect effects of the internal state are observed by way of the system outputs. The state observer module in such cases facilitates reconstructing at least a part of the internal system state based on the output measurements.

For example, an EPS system includes a motor that facilitates providing a driver assist during operation of the EPS system. Motor velocity is a critical signal for control of the EPS system. The motor velocity may be directly measured using sensors and/or tachometers. However, such direct measurement requires additional hardware, which leads to additional costs as well as engineering. Accordingly, it is desirable to use a state observer module to estimate the motor velocity signal in addition to other aspects of the working of the EPS system, without significant loss of accuracy.

SUMMARY

According to one or more embodiments, a steering system determines a motor velocity estimate for a motor of the steering system. The steering system may include a state observer module that computes a base motor velocity estimate of the motor based on a plant model of the steering system. The steering system may further include a delay compensation module that computes a delay compensated velocity estimate based on the base motor velocity estimate and an acceleration of the motor. The steering system may further include a standstill detection module that modifies the delay compensated velocity estimate in response to a handwheel of the steering system being in standstill mode.

According to one or more embodiments, a method for determining a motor velocity estimate for a motor of a steering system is described, where the method is implemented by a control module of the steering system. The method includes computing a base motor velocity estimate of the motor based on a plant model of the steering system. The method further includes computing a delay compensated velocity estimate based on the base motor velocity estimate and an acceleration of the motor. The method may further include modifying the delay compensated velocity estimate in response to a handwheel of the steering system being in standstill mode.

According to one or more embodiments, an electric power steering (EPS) system includes a state observer module configured to compute a base motor velocity estimate of a motor based on a plant model of the EPS. The EPS system may further include a standstill detection module that modifies a delay compensated velocity estimate in response to a handwheel of the EPS system being in standstill mode, where the delay compensated velocity estimate is computed based on the base motor velocity and an acceleration of the motor. For example, the EPS further includes a delay compensation module that computes a delay compensated velocity estimate based on the base motor velocity estimate and an acceleration of the motor.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
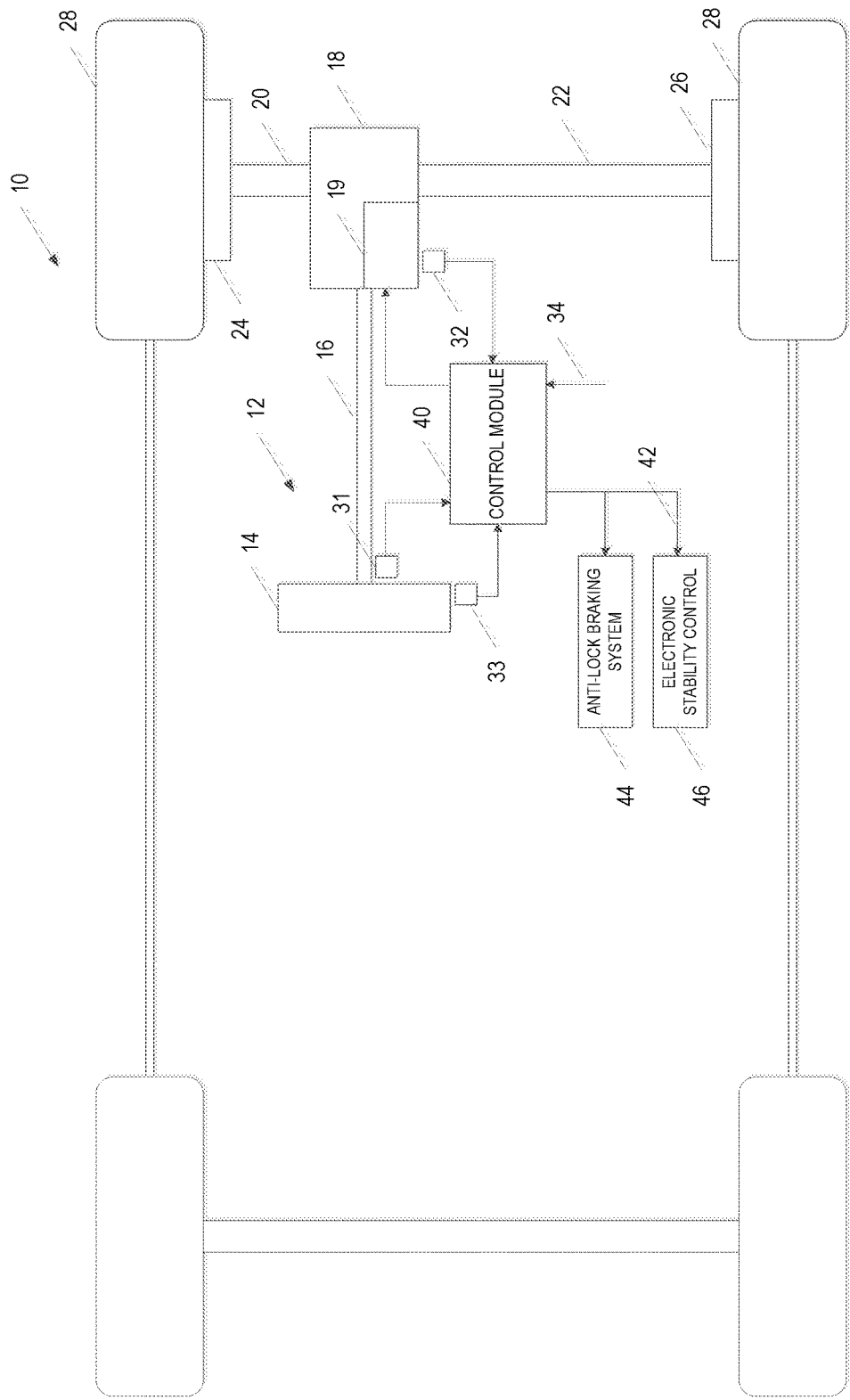
FIG. 1 illustrates an exemplary embodiment of a vehicle 10 including a steering system, according to one or more embodiments.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

In an EPS system equipped with a Permanent Magnet DC (PMDC) motor, no position sensors are used. Thus, typically, an observer module of such an EPS system estimates a motor velocity signal for a motor of the EPS system by using a predetermined plant model for the EPS. Alternatively, in case of an EPS system equipped with a Permanent Magnet Synchronous Motor (PMSM), the motor subsystem uses multiple position sensors for commutation and diagnostics. The observer module in such cases uses one or more position signals from the position sensors for estimating the motor velocity. However, the technical solutions described herein are applicable for PMSM based EPS systems as well, and the estimated velocity signal may further be used for other purposes in such systems.

A typical observer module estimates the motor velocity for a brushed motor using an open loop, which requires an accurate model (parameters) of the brush motor, which is difficult to obtain. Thus, the motor velocity estimate is highly sensitive to motor parameter estimation errors both from a dynamic and steady state standpoint, because the motor parameters vary nonlinearly with operating condition and are difficult to estimate accurately. For example, in an EPS system with a PMDC motor, slight parameter estimation errors (modeling inaccuracies) result in incorrect velocity estimation near zero speed and at standstill (motor speed equal to zero). Further, depending upon the specific parameter estimate that is inaccurate, the resulting velocity estimate can have an undesirable phase lag or lead (from a dynamic standpoint). Further, the open loop nature of the observer module leads to low bandwidth signal estimate. In other words, open loop observers typically produce a signal estimate that, sometimes significantly, lags the actual signal, and have a lower magnitude as the signal frequency increases. Alternatively, a typical observer module, in case of a brushless motor, estimates the motor velocity by differentiating a position signal that is received from a position sensor of the motor, which is typically a higher bandwidth estimate since it is produced from an actual measurement of position.

The embodiments described herein facilitate estimating the motor velocity of a motor of the EPS accurately, at all velocities including standstill motor position, using an observer module. Further, the embodiments described herein do not require additional sensors to be used for the estimation. The EPS system uses the estimated motor velocity for functions such as damping, inertia compensation, hysteresis compensation, and the like. Further yet, the EPS system uses the estimated motor velocity for active power management as well as current control of the motor. In one or more examples, the embodiments use a mechanical model of the EPS system to obtain the motor velocity estimate. Further, in one or more examples, the embodiments facilitate compensating estimation delays to address the phase lag/lead technical problems described earlier. Further yet, in one or more examples, the embodiments facilitate accurate detection for standstill motor conditions. The observer module implementing the technical solutions described herein may be used for both brush and brushless motor based EPS systems containing a handwheel position sensor. The observer module thus facilitates control and diagnostics in sensorless control for Permanent Magnet Synchronous Motors (PMSM) drives and for accurate control of PMDC drive systems, both at a motor control level as well as system level steering control.

Referring now to the Figures, where the invention will be described with reference to specific embodiments, without limiting same, FIG. 1 illustrates an exemplary embodiment of a vehicle 10 including a steering system 12. In various embodiments, the steering system 12 includes a handwheel 14 coupled to a steering shaft system 16 which includes steering column, intermediate shaft, & the necessary joints. In one exemplary embodiment, the steering system 12 is an EPS system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque applied to the handwheel 14 by the operator of the vehicle 10. The torque sensor generates a driver torque signal based thereon. In another example, the sensor 32 is a handwheel position sensor that senses a rotational angle as well as a rotational speed of the handwheel 14. The sensor 32 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning and perform friction classification to determine a surface friction level 42 as a control signal that can be used to control aspects of the steering system 12 through the steering assist unit 18. The surface friction level 42 can also be sent as an alert to an Anti-lock Braking System (ABS) 44 and/or Electronic Stability Control (ESC) system 46 indicating a change in surface friction, which may be further classified as an on-center slip (i.e., at lower handwheel angle) or an off-center slip (i.e., at higher handwheel angle) as further described herein. Communication with the ABS 44, ESC system 46, and other systems (not depicted), can be performed using, for example, a controller area network (CAN) bus or other vehicle network known in the art to exchange signals such as the vehicle speed signal 34.

Figure 2:
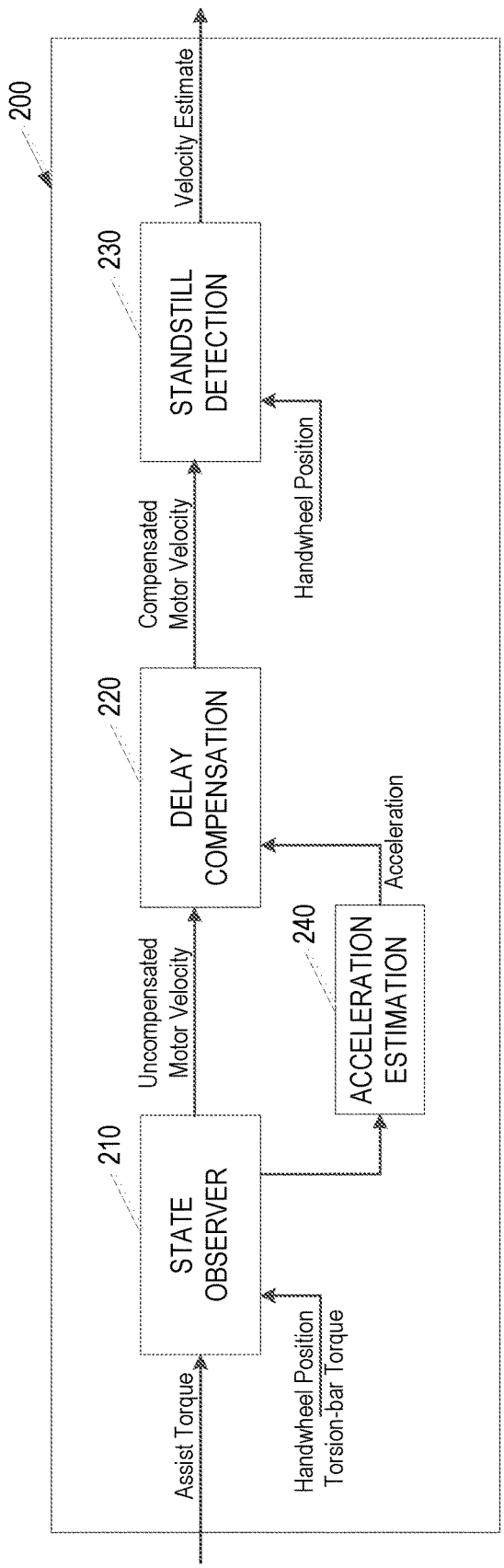
FIG. 2 illustrates a system for estimating the motor velocity of the steering system, according to one or more embodiments.

FIG. 2 illustrates a system 200 for estimating the motor velocity of the motor 19 of the steering system 12. The steering system 12 is an EPS system. The system 200 includes, among other components, a state observer module 210, a delay compensation module 220 that uses an acceleration estimate calculated using the acceleration estimation module 240, and a standstill detection module 230.

The state observer module 210 determines a base (uncompensated) motor velocity estimate of the motor 19 of the EPS system 12 based on a plant model of the EPS system. The EPS system 12 may be modeled as a 2-mass system, a 3-mass system, or any other order mechanical model. The order of the model may affect accuracy of the estimated motor velocity determined by the observer module.

Figure 3:
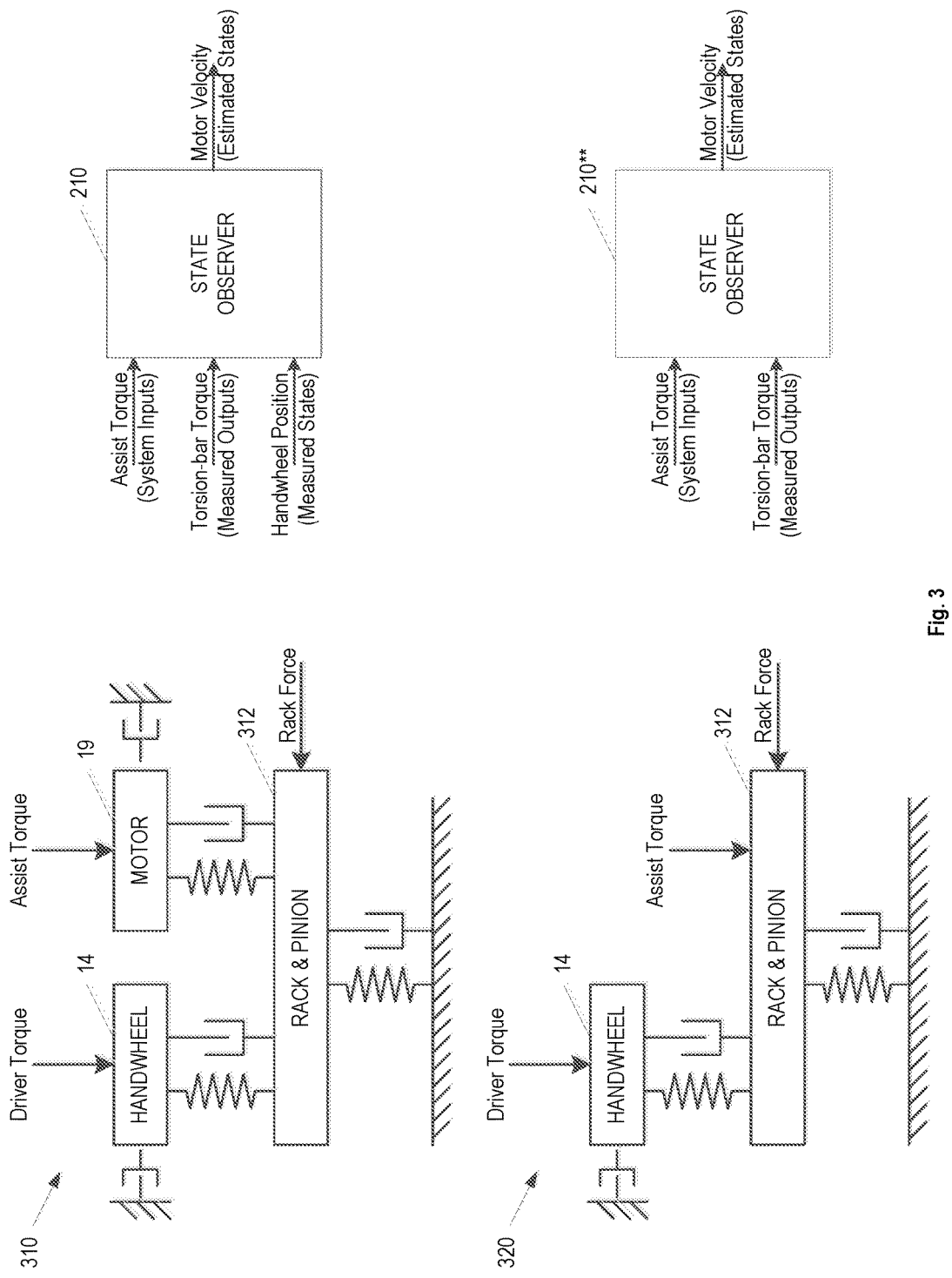
FIG. 3 illustrates example plant models of a steering system, according to one or more embodiments.

FIG. 3 illustrates example plant models of the steering system 12. In one or more examples, the state observer module 210 uses a 3-mass plant model 310 of the EPS system 12, which may be described by the following mathematical expressions in continuous time.

$$\dot{x} = Ax + Bu + Ed$$

$$y = Cx$$

where x is a state vector including values of the current state of the EPS system 12, u is an input vector including measurable (and controllable) inputs to the EPS system 12, and d is a disturbance vector including measurable values that are not controllable, and typically non-linear in nature. Further, y is an output vector that is based on the current state x of the EPS system 12. A, B, C, and E, are configurable matrices which are setup to model the motor 19 of the EPS system 12. In one or more examples, the matrices may be preconfigured. Because the plant's current outputs and its future state are both determined based on the current states and the current inputs, the output of the plant, y(k) is used to steer the state of the state observer module 210.

In the 3-mass plant model 310, the EPS system 12 experiences a driver torque $T_d$, an assist torque $T_a$, and a rack force or equivalent rack torque $T_r$. The driver torque represents the force applied by the operator/driver of the vehicle 10 on the handwheel to steer the vehicle 10. The assist torque represents the driver assist torque provided by the EPS system 12 to assist the driver to steer the vehicle 10. The rack torque represents forces, such as friction, experienced by the rack and pinion 312 of the EPS system 12 as the vehicle 10 is operating; for example, friction from the wheels 28 and 30 contacting a road surface etc.

Accordingly, in case of the 3-mass plant model 310, the system 200 uses the assist torque $T_a$ as the system input u, a torsion bar $T_{bar}$ as disturbances d, and a handwheel angle $\theta_{hw}$ as a part of the measured state x. As illustrated in FIG. 3, the state observer module 210 computes and subsequently outputs the estimated base motor velocity estimate using the 3-mass plant model 310.

The assist torque is the torque provided by the motor 19 in the most recent iteration. Alternatively, or in addition, the assist torque input is based on predetermined constants such as the motor back-EMF (BEMF) constant $K_e$ and measured current(s) provided to the motor 19. Alternatively, or in addition, a torque assist command provided to the EPS system 12 may be analyzed to determine the torque assist, if current sensors of the motor subsystem are deemed to be inaccurate (for example, in a fault condition). Thus, $u=[T_e]$.

The disturbances vector includes the driver torque and rack torque, i.e., $d=[T_d\ T_r]'$. Further, $x=[\theta_{HW}\ \omega_{HW}\ \theta_{AM}\ \omega_{AM}\ \theta_m\ \omega_m]'$ is the state vector consisting of the position and velocity of the handwheel 14. The parameters in the matrices A, B, C, and D, include inertia (J), damping (K), and stiffness (b) of the handwheel 14, assist subsystem 18, and the motor 19. Accordingly, the mathematical expressions above can be expressed as Further, in case the state observer module 210 operates in a reduced order mechanical model of the EPS system 12, such as a 2-mass model 320 (FIG. 3), the technical solutions herein eliminate the measured states from the computations described earlier. In this case, the handwheel position is the measured state. FIG. 3 illustrates a state observer module 210\*\* that only receives the system inputs and the measured outputs (without the measured states as illustrated by 210) and outputs the base (uncompensated) motor velocity estimate. In addition, the handwheel velocity may be obtained directly by differentiating velocity. Thus, two states (or one only if so desired) may be removed, leading to the state observer module 210 with lower complexity, which facilitates implementation, however at possibly lower accuracy.

In one or more examples, for reduced order observer modules, the plant matrices are split based on the measured states, and a standard state observer (similar to the one presented below) may be designed for the effectively "reduced" system. For example, for the 3-mass model for the case where two states are removed, the A and B matrices are split as follows.

$$A = \begin{bmatrix} A_{11} & A_{12} \\ A_{21} & A_{22} \end{bmatrix}$$

$$A_{22} = \begin{bmatrix} 0 & 1 & 0 & 0 \\ -\frac{K_C + K_{coup} + K_L}{J_{AM}} & -\frac{b_{AM} + b_{coup}}{J_{AM}} & \frac{K_{coup}}{J_{AM}} & \frac{b_{coup}}{J_{AM}} \\ 0 & 0 & 0 & 1 \\ \frac{K_{coup}}{J_m} & \frac{b_{coup}}{J_m} & -\frac{K_{coup}}{J_m} & -\frac{b_{coup}+b_m}{J_m} \end{bmatrix}$$

$$\begin{bmatrix} \dot\theta_{HW} \\ \dot\omega_{HW} \\ \dot\theta_{AW} \\ \dot\omega_{AM} \\ \dot\theta_m \\ \dot\omega_m \end{bmatrix} = \begin{bmatrix} 0 & 1 & 0 & 0 & 0 & 0 \\ -\frac{K_C}{J_{HW}} & -\frac{b_C+b_{HW}}{J_{HW}} & \frac{K_C}{J_{HW}} & \frac{b_C}{J_{HW}} & 0 & 0 \\ 0 & 0 & 0 & 1 & 0 & 0 \\ \frac{K_C}{J_{AM}} & \frac{b_C}{J_{AM}} & -\frac{K_C+K_{coup}+K_L}{J_{AM}} & -\frac{b_{AM}+b_{coup}}{J_{AM}} & \frac{K_{coup}}{J_{AM}} & \frac{b_{coup}}{J_{AM}} \\ 0 & 0 & 0 & 0 & 0 & 1 \\ 0 & 0 & \frac{K_{coup}}{J_m} & \frac{b_{coup}}{J_m} & -\frac{K_{coup}}{J_m} & -\frac{b_{coup}+b_m}{J_m} \end{bmatrix} \begin{bmatrix} \theta_{HW} \\ \omega_{HW} \\ \theta_{AW} \\ \omega_{AM} \\ \theta_m \\ \omega_m \end{bmatrix} +$$

$$\begin{bmatrix} 0 \\ 0 \\ 0 \\ 0 \\ 0 \\ \frac{1}{J_m} \end{bmatrix} [T_e] + \begin{bmatrix} 0 & 0 \\ \frac{1}{J_{HW}} & 0 \\ 0 & 0 \\ 0 & \frac{1}{J_{AM}} \\ 0 & 0 \\ 0 & 0 \end{bmatrix} \begin{bmatrix} T_d \\ T_r \end{bmatrix}$$

$$[T_{bar}] = \begin{bmatrix} -K_C & 0 & K_C & 0 & 0 & 0 \end{bmatrix} \begin{bmatrix} \theta_{HW} \\ \omega_{HW} \\ \theta_{AW} \\ \omega_{AM} \\ \theta_m \\ \omega_m \end{bmatrix}$$

$$B = \begin{bmatrix} B_{11} \\ B_{22} \end{bmatrix}$$

$$B_{22} = \begin{bmatrix} 0 \\ 0 \\ 0 \\ \frac{1}{J_m} \end{bmatrix}$$

Figure 4:
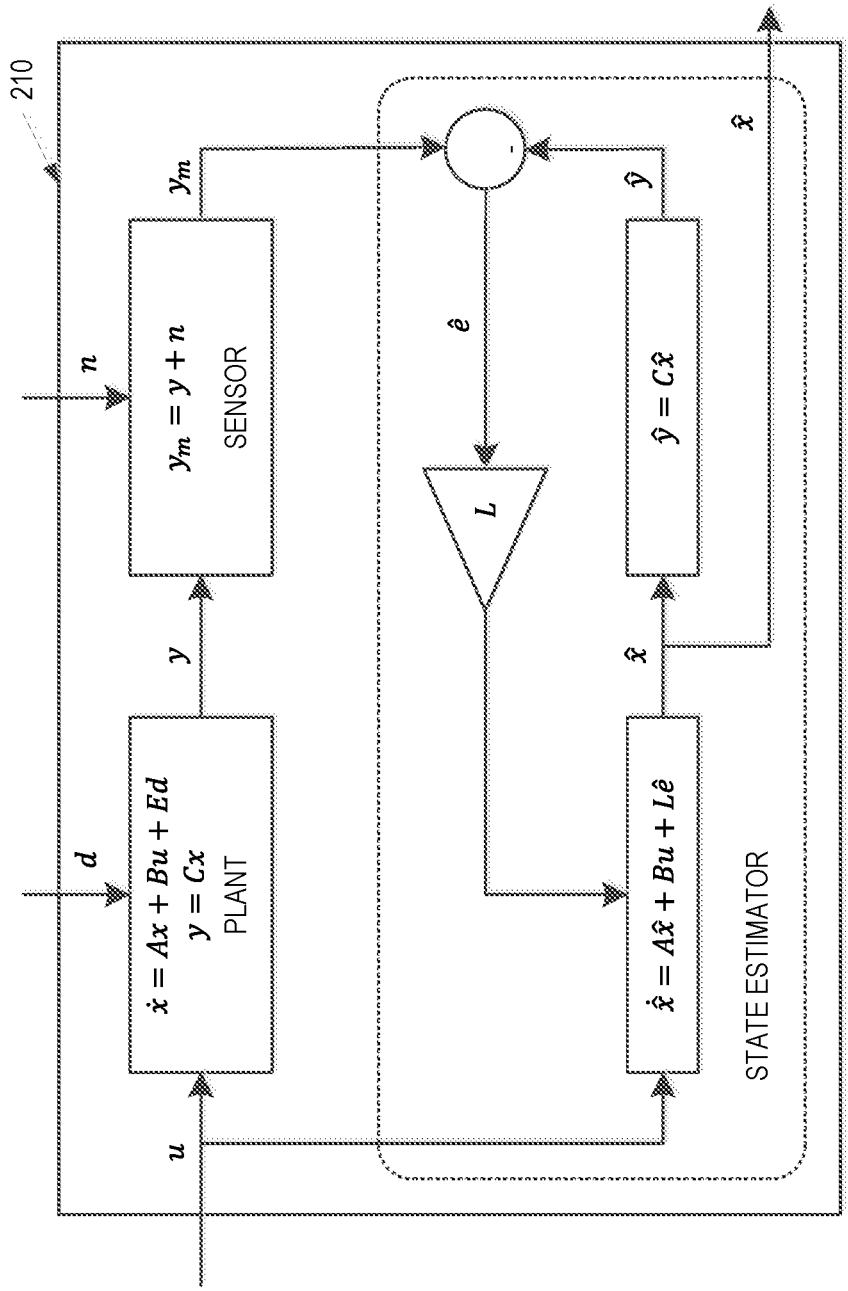
FIG. 4 depicts a structure and a dataflow for a state observer module, according to one or more embodiments.

Thus, in one or more examples, the technical solutions implement a reduced order state observer module 210 using matrices $A_{22}$ and $B_{22}$. FIG. 4 depicts a structure and a dataflow for the state observer module 210. The state observer module 210 operates such that $\dot{\hat{x}} = A\hat{x} + Bu + L(y - \hat{y})$, where L is an observer gain matrix with configurable parameters, and $(y - \hat{y})$ represents an error $\hat{e}$, which is a difference between the output y from the motor and estimate $\hat{y}$ from the state observer module 210. The parameters in L are tuned using tuning techniques such as linear quadratic Gaussian (LQG), pole placement, and the like or a combination thereof. In other examples, as mentioned earlier, the state observer module 210 uses a reduced order computation, such as that for a 2-mass model, by removing one of the measured states, which in this case is the handwheel position.

Thus, the state observer module 210 is a closed-loop observer that computes an estimate $\hat{x}(k)$ at each time k of the state x(k), by measuring the output y(k) and input u(k). For example, the state observer module 210 employs the observer gain matrix L such that on receiving successive measured values of the plant's inputs and outputs, the model's state converges to that of the plant (that is, magnitude of $\hat{e}$ is below a predetermined threshold such as 0.1. 0.001, or the like; substantially 0). For example, the output of the state observer module 210 $\hat{y}$ is subtracted from the output y of the plant and then multiplied by the gain matrix L. The result is then added to compute the estimate $\hat{x}$.

The estimated output from the state observer module 210 includes a lag. The delay compensation module 220 facilitates reducing, if not eliminating, the lag introduced by the processing in the state observer module 210. For example, a prediction term is added to the observed velocity to improve the phase lag. The velocity is related to acceleration (which is an indirect output of the state observer module 210) as shown below.

$$\alpha_m(s) = s\omega_m(s)$$

The delay compensation module 220 uses the acceleration value in discrete time to compensate the delay. In one or more examples, as illustrated in FIG. 2, the delay compensation module 220 receives the uncompensated estimated velocity from the state observer module 210 and computes a delay compensated velocity estimate. For example, the delay compensated estimate is computed as shown below.

$$\omega'_m[n] = \omega_{mb}[n] + T_{pred}\alpha_m[n]$$

Here, $T_{pred}$ is the amount of the dynamic time-delay that needs to be compensated. In the example above, the computation is based on a derivative approximation $$s = \frac{1 - z^{-1}}{T_s}$$

for the acceleration $\alpha$. In other examples, a different approximation may be used for computing the acceleration, resulting in the computation of the delay compensated velocity estimate to be different than above expression.

Figure 5:
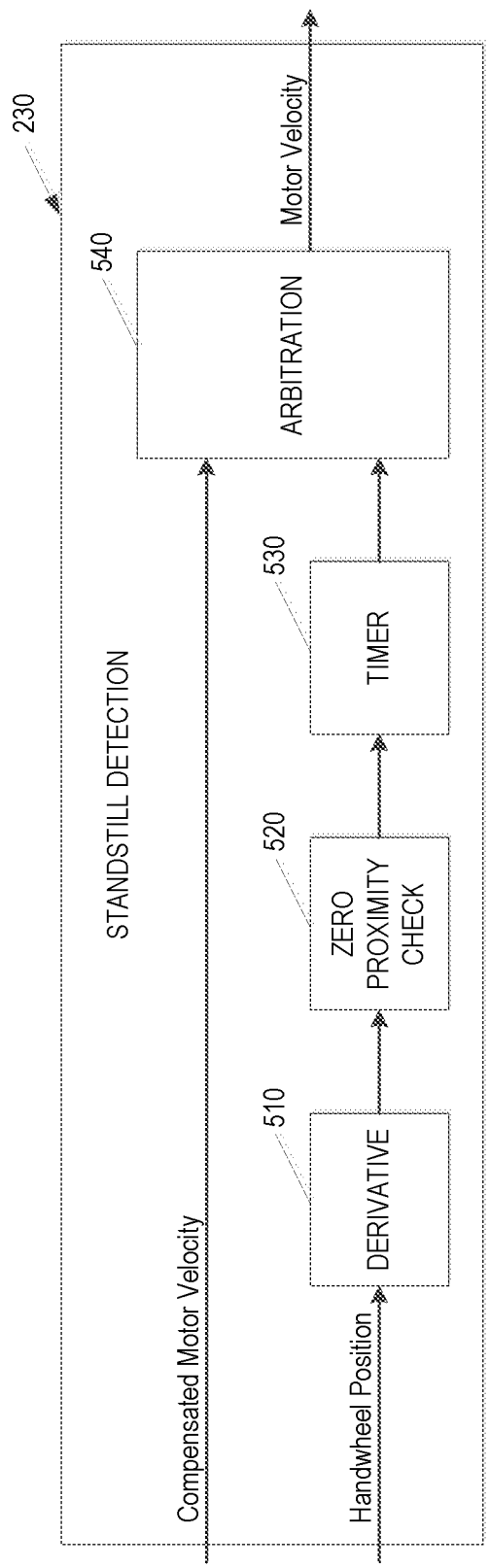
FIG. 5 illustrates a block diagram of a standstill detection module, according to one or more embodiments.

The standstill detection module 230 facilitates detecting whether the motor 19 is in standstill mode. Typically, plant-modeling errors result in inaccurate speed information near zero speed, which may be critical information for control functions. Accordingly, the standstill detection module 230 facilitates detecting whether the motor is in standstill based on the handwheel position. FIG. 5 illustrates a block diagram of the standstill detection module 230, according to one or more examples. The standstill detection module receives the delay compensated velocity estimate and handwheel position signals. In one or more examples, the standstill detection module 230 includes a derivative module 510 that differentiates the handwheel signal. The standstill detection module 230 further includes a zero proximity check module 520 that determines if the output of the derivative module 510 is within a predetermined range from 0 (zero). For example, the predetermined range may be +/−0.5, +/−0.2, +/−0.01, or any other such range on either side of 0. In one or more examples, the standstill detection module 230 further includes a timer 530 that facilitates determining a duration for which the derivative of the handwheel signal, output by the derivative module 510 is within the predetermined range. The standstill detection module 230 further includes an arbiter module 540 that modifies the delay compensated motor velocity estimate from the delay compensation module 220.

The system 200 using the technical solutions described herein facilitates estimating the motor velocity, and compared to current estimation modules, facilitates improvements in both the magnitude and phase responses of the estimated motor velocity. Further yet, the estimated motor velocity obtained using the technical solutions described herein provide an improvement in accuracy across all frequencies.

Figure 6:
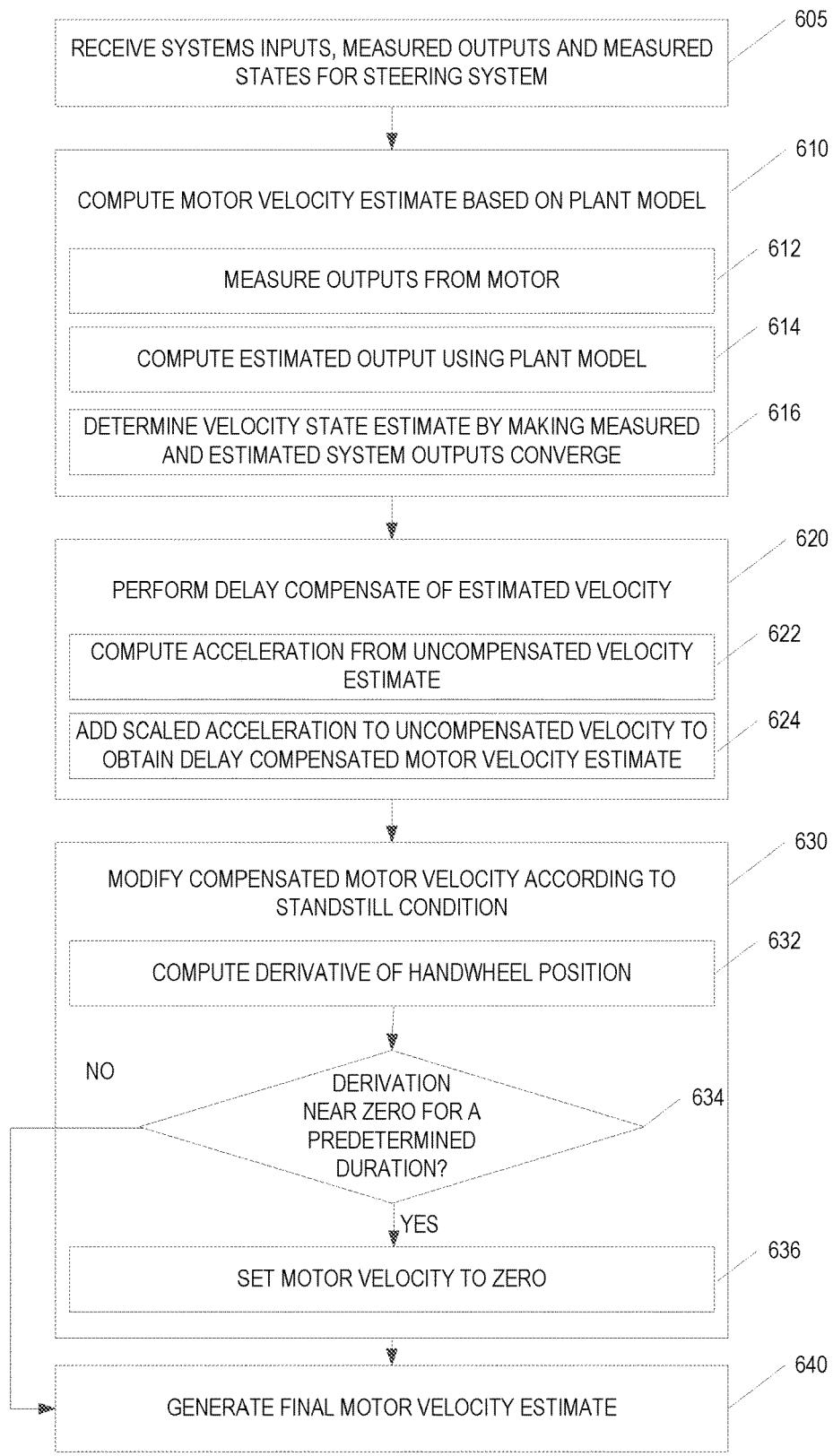
FIG. 6 illustrates a flowchart of an example method for estimating motor velocity of an electric power steering system, according to one or more embodiments.

FIG. 6 illustrates a flowchart of an example method for estimating the motor velocity using the system 200 implementing the technical solutions described herein. In one or more examples, the system 200 receives system inputs $T_a$, measured outputs $T_{bar}$, and measured states $\theta_{HW}$ for the steering system 12, as shown at 605. The state observer module 210 estimates a motor velocity $\omega_{mb}$ using a plant model and a state observer, as shown at 610. The state observer module 210 may use a Luenberger observer, or any other type of observer model to estimate the motor velocity. The state observer module 210 may use a plant model of any order to estimate the EPS system 12, such as a 3-mass model, a 2-mass model, or any other higher or lower order mass model. Typically, the higher the order of the mass model used, higher is the complexity of implementation and higher is the accuracy. The examples described herein provide computations for a 3-mass model and a 2-mass model; however, a person skilled in the art can use a different ordered mass model instead. Estimating the motor velocity includes measuring output parameters of the motor 19, as shown at 612, and comparing those with estimates from the state observer module 210 that uses the plant model, as shown at 614. The state observer module 210 measures a difference $\hat{e}$ between the measured outputs and the estimated outputs, and uses the gain matrix L such that the difference $\hat{e}$ between the two outputs converges to a predetermined value, which is substantially 0. Accordingly, the state observer module 210 makes the two outputs converge, as shown at 616. In the converged state, the state observer module 210 outputs the base estimated velocity.

The method further includes compensating the estimated velocity for delay or lag that may be introduced during computations by the state observer module 210, as shown at 620. The compensation delay is performed after the gain matrix is tuned, and thus is an additional improvement beyond converging the estimated outputs of the plant model and the measured outputs from the motor 19, as shown at 622. A scaled acceleration value is added to the base uncompensated motor velocity estimate to compute delay compensated motor velocity, as shown at 624

The method further includes blending the delay compensated motor velocity using the standstill detection module 230, as shown at 630. As described earlier, the standstill detection module 230 determines if the motor is at standstill by differentiating the handwheel position signal, and checks if the derivative of the handwheel position is substantially 0 for at least a predetermined duration, as shown at 632 and 634. If the condition is met, the standstill detection module 230 sets the estimated motor velocity to 0, as shown at 636.

The method further includes outputting the estimated motor velocity as shown at 640. Based on whether the handwheel was at standstill, the estimated motor velocity that is output is either 0, or the delay compensated estimated motor velocity. The estimated motor velocity is output to one or more components of the EPS system 12 and/or the vehicle 10 for providing functions such as damping, inertia compensation, hysteresis compensation among others.

In one or more examples, the method also checks if a handwheel position sensor is operative, and in case the sensor is malfunctioning, the system 200 does not execute the method described above.

Figure 7:
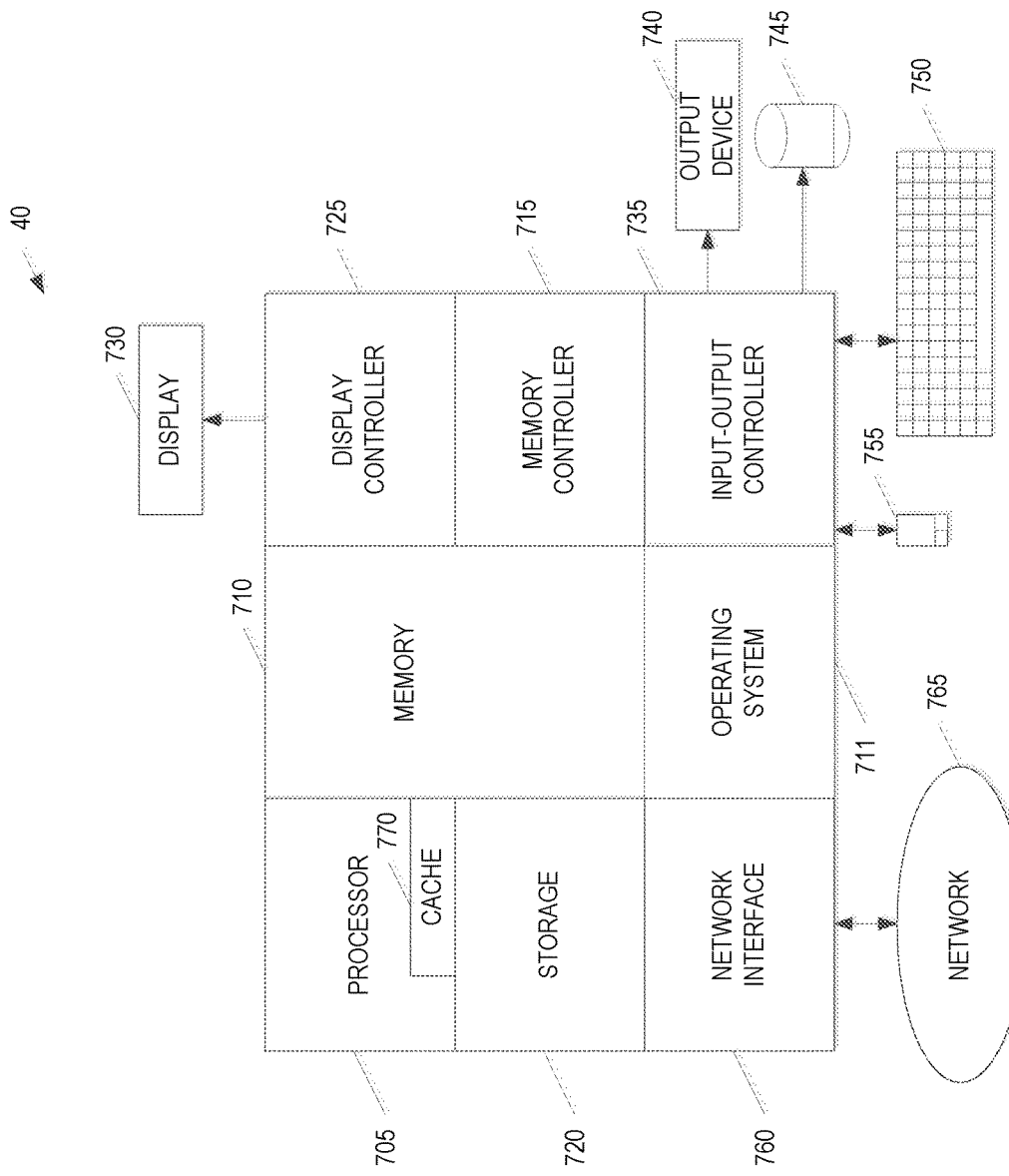
FIG. 7 illustrates an example of a control module, according to one or more embodiments.

FIG. 7 illustrates an example of the control module 40 of the EPS system 12. The control module 40 includes hardware, such as electronic circuitry, for example a microprocessor.

The control module 40 includes, among other components, a processor 705, memory 710 coupled to a memory controller 715, and one or more input devices 745 and/or output devices 740, such as peripheral or control devices that are communicatively coupled via a local input-output (I/O) controller 735. These devices 740 and 745 may include, for example, battery sensors, position sensors, indicator/identification lights and the like. Input devices such as a conventional keyboard 750 and mouse 755 may be coupled to the I/O controller 735. The I/O controller 735 may be, for example, one or more buses or other wired or wireless connections, as are known in the art. The I/O controller 735 may have additional elements, which are omitted for simplicity, such as controllers, buffers (caches), drivers, repeaters, and receivers, to enable communications.

The I/O devices 740, 745 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 705 is a hardware device for executing hardware instructions or software, particularly those stored in memory 710. The processor 705 may be a custom made or commercially available processor, a central processing unit (CPU), an auxiliary processor among several processors associated with the control module 40, a semiconductor based microprocessor (in the form of a microchip or chip set), a macroprocessor, or other device for executing instructions. The processor 705 includes a cache 770, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 770 may be organized as a hierarchy of more cache levels (L1, L2, and so on.).

The memory 710 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 710 may incorporate electronic, magnetic, optical, or other types of storage media.

The instructions in memory 710 may include one or more separate programs, each of which comprises an ordered listing of executable instructions for implementing logical functions. In the example of FIG. 7, the instructions in the memory 710 include a suitable operating system (OS) 711. The operating system 711 essentially may control the execution of other computer programs and provides scheduling, input-output control, file and data management, memory management, and communication control and related services.

Additional data, including, for example, instructions for the processor 705 or other retrievable information, may be stored in storage 720, which may be a storage device such as a hard disk drive or solid state drive. The stored instructions in memory 710 or in storage 720 may include those enabling the processor to execute one or more aspects of the systems and methods described herein.

The control module 40 may further include a display controller 725 coupled to a user interface or display 730. In some embodiments, the display 730 may be an LCD screen. In other embodiments, the display 730 may include a plurality of LED status lights. In some embodiments, the control module 40 may further include a network interface 760 for coupling to a network 765. The network 765 may be a CAN-based network, or an IP-based network for communication between the control module 40 and other components of the vehicle 10. The network 765 transmits and receives data between the control module 40 and external components. In one or more examples, the control module 40 implements the technical solutions described herein.

The technical solutions described herein facilitate an EPS system to estimate a motor velocity of a motor of the EPS system using a state observer module using a mechanical model (plant model) of the EPS system. Further, the technical solutions facilitate compensating for estimation delays. Further yet, the technical solutions facilitate standstill detecting and estimating the motor velocity at standstill. The technical solutions may be used for both brush and brushless motor based EPS systems containing a handwheel position sensor. The technical solutions facilitate improved control and diagnostics in sensor less control techniques for PMSM drives and for accurate control of PMDC drive systems, both at a motor control level as well as system level steering control.

The technical solutions provide improvements by providing a higher bandwidth for estimating the motor velocity, and facilitating a delay compensation that reduces (or eliminates) phase lead/lag. In addition, the technical solutions provide an improved estimate at standstill, and an accurate estimation at higher frequencies of the state observer. Thus, the technical solutions, in comparison to typical motor velocity estimation techniques, provide better amplitude and phase response characteristics.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A steering system comprising:
    a motor; and
    a processor that determines a motor velocity estimate for the motor, the determination of the motor velocity estimate comprising:
    computing a base motor velocity estimate of the motor based on a plant model of the steering system; and
    modifying a delay compensated velocity estimate in response to a handwheel of the steering system being in standstill mode, the delay compensated velocity estimate being computed based on the base motor velocity, wherein the delay compensated velocity estimate is used as the motor velocity estimate for computing one or more commands for controlling the motor.

2. The steering system of claim 1, wherein the delay compensated velocity estimate is used for at least one of damping, inertia compensation, and hysteresis compensation, by the steering system.

3. The steering system of claim 1, wherein the processor computes the base motor velocity estimate based on:
    an assist torque generated by the steering system as a current input to the plant model of the steering system, and a handwheel torque measured by a handwheel sensor as a measured output of the plant model of the steering system.

4. The steering system of claim 3, wherein the processor computes the base motor velocity estimate further based on a handwheel position as a measured state of the plant model of the steering system.

5. The steering system of claim 1, wherein the processor is further configured to compute the delay compensated velocity estimate based on the base motor velocity estimate and an acceleration of the motor.

6. The steering system of claim 5, wherein the processor computes the acceleration of the motor by computing a derivative of the motor velocity estimate.

7. The steering system of claim 1, wherein the processor determines that the handwheel is in standstill mode based on a derivative of a handwheel position.

8. The steering system of claim 7, wherein the processor determines that the handwheel is in standstill mode in response to the derivative of the handwheel position being in a predetermined range for a predetermined duration of time.

9. The steering system of claim 1, wherein the processor modifies the delay compensated velocity estimate to zero in response to the handwheel being in standstill mode.

10. The steering system of claim 1, wherein the motor is a brushless motor.

11. The steering system of claim 1, wherein the motor is a brushed motor.

12. A method for determining a motor velocity estimate, the method implemented by a processor of a steering system, the method comprising:
    computing a base motor velocity estimate of a motor of the steering system based on a plant model of the steering system;
    computing a delay compensated velocity estimate based on the base motor velocity estimate and an acceleration of the motor; and
    modifying the delay compensated velocity estimate in response to a handwheel of the steering system being in standstill mode, the delay compensated velocity estimate is used as the motor velocity estimate for generating one or more commands to control the motor.

13. The method of claim 12, wherein the steering system uses the delay compensated velocity estimate for at least one of damping, inertia compensation, and hysteresis compensation.

14. The method of claim 12, wherein computing the base motor velocity estimate is based on:
   an assist torque generated by the steering system as a current input to the plant model of the steering system, and
   a handwheel torque measured by a handwheel sensor as a measured output of the plant model of the steering system.

15. The method of claim 14, wherein computing the base motor velocity estimate is further based on a handwheel position as a measured state of the plant model of the steering system.

16. The method of claim 12, wherein determining that the handwheel is in standstill mode is based on a derivative of a handwheel position.

17. The method of claim 16, wherein the handwheel is determined to be in standstill mode in response to the derivative of the handwheel position being in a predetermined range for a predetermined duration of time.

18. The method of claim 12, wherein modifying the delay compensated velocity estimate comprises setting the delay compensated velocity estimate to zero in response to the handwheel being in standstill mode.

19. An electric power steering (EPS) system comprising:
   a handwheel;
   a motor; and
   one or more processors configured to:
      compute a base motor velocity estimate of the motor based on a plant model of the steering system;
      compute a delay compensated velocity estimate based on the base motor velocity estimate and an acceleration of the motor; and
      modify the delay compensated velocity estimate in response to the handwheel being in standstill mode.

20. The electric power steering system of claim 19, wherein the base motor velocity estimate is computed based on:
   an assist torque generated by the steering system as a current input to the plant model of the EPS system, and
   a handwheel torque measured by a handwheel sensor as a measured output of the plant model of the EPS system.

* * * * *